United States Patent
Malfa et al.

(10) Patent No.: US 6,459,178 B1
(45) Date of Patent: *Oct. 1, 2002

(54) FORCED-CONVECTION HEAT EXCHANGER FOR A ROTARY ELECTRICAL MACHINE

(75) Inventors: Enrico Malfa, Zanica; Marcello Garavaglia, Milan; Piero Bodini, Vittuone, all of (IT)

(73) Assignee: ABB Research Ltd., Zurig (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/475,066

(22) Filed: Dec. 30, 1999

(30) Foreign Application Priority Data

Dec. 30, 1998 (IT) .......................... MI98A2858

(51) Int. Cl.⁷ .................................. H02K 9/00
(52) U.S. Cl. ............................ 310/52; 310/64
(58) Field of Search .............. 310/52, 53, 54, 310/57, 58, 59, 60 R, 63, 64, 60 A

(56) References Cited

U.S. PATENT DOCUMENTS 5,323,079 A   6/1994  Nieves et al.
5,589,131 A * 12/1996  Steketee ............... 264/568

FOREIGN PATENT DOCUMENTS

DE    197 47 759      5/1998
EP    0 645 871       3/1995
JP    410188692 A *   7/1998 ........... H01B/12/16

OTHER PUBLICATIONS

Patent Abstracts of Japan, vol. 006, No. 238, (E-144), Nov. 26, 1982, JP 57-138832, Aug. 27, 1982.

* cited by examiner

Primary Examiner—Nestor Ramirez
Assistant Examiner—Thanh Lam
(74) Attorney, Agent, or Firm—Oblon, Spivak, McClelland, Maier & Neustadt, P.C.

(57) ABSTRACT

A force-convection heat exchanger for a rotary electrical machine, which includes one or more tubing elements arranged between the conductors that constitute the stator windings of the rotary electrical machine. A cooling fluid circulates into the tubing elements.

10 Claims, 3 Drawing Sheets

FORCED-CONVECTION HEAT EXCHANGER FOR A ROTARY ELECTRICAL MACHINE

BACKGROUND OF THE INVENTION

1. Field of the Invention

The present invention relates to a forced-convection heat exchanger for rotary electrical machines.

2. Discussion of the Background

More particularly, the invention relates to a forced-convection heat exchanger of the compact type for a rotary electrical machine such as an electric motor.

Rotary electrical machines are traditionally plagued by significant losses due to the Joule effect in the stator elements (copper and iron) and due to the viscous friction between the surfaces and the fluid that circulates in the space between the rotor and the stator of rotary electrical machines.

This situation worsens as the rotation rate of the machines rises.

According, it is necessary to provide a cooling system which is capable of dissipating the generated heat and of ensuring that the maximum temperatures reached by the rotor and the stator are such as to avoid degrading the electromechanical performance of the materials that are typically used.

For example, for a permanent-magnet motor, the permanent magnets must not reach excessively high temperatures, on penalty of losing or degrading their magnetic properties.

The system must also typically work within clearly defined temperature values which are generally rather low in order to have low costs.

The heat exchanger must also be compact and highly efficient. The problem of removing the heat generated by an electrical machine is currently dealt with in various manners.

The main technique consists in using fins which are struck by a stream of air generated by a fan and are arranged on the shell of the machine or inside it according to the various configurations.

When a fluid is used for cooling, the motor is enclosed with a jacket inside or outside which the fluid is made to pass through appropriately shaped passages. Cooling can affect both the stator, as is usually the case, and the rotor, and in this case cooling generally occurs by a static exchanger arranged around the rotor.

The effectiveness of the exchanger is more important in high-speed machines with dimensions that must be compact and in which accordingly the dimensions of the auxiliary components, such as the heat exchanger, cannot exceed certain values.

Two kinds of heat exchangers are generally used in conventional electrical machines.

A first type has a constant cross-section, in which the flow is generally laminar. In order to increase the efficiency of this heat exchanger, it is necessary to increase the speed so as to produce turbulent motion conditions. This type entails a significant increase in pressure losses and entails higher pumping costs.

A second type is the one in which the motion is rendered turbulent by inserting appropriate obstacles. This solution has the advantage of increasing heat exchange efficiency for an equal flow-rate of the cooling fluid. Despite the fact that the presence of obstacles increases pressure losses, accordingly requiring once again to use pumping elements capable of propelling the fluid under high pressure differentials, this solution is generally more efficient than the preceding one.

SUMMARY OF THE INVENTION

The aim of the present invention is to provide a forced-convection heat exchanger for rotary electrical machines which is highly efficient and capable of removing the considerable thermal energy levels generated in the stator and rotor elements of the electric motor. Within the scope of this aim, an object of the present invention is to provide a forced-convection heat exchanger which is particularly compact and therefore suitable for electric motors which are compact but have a high specific power level.

Another object of the present invention is to provide a forced-convection heat exchanger for motors which exchanger allows one to remove heat from the regions of the electric motor where it is generated most.

Another object of the present invention is to provide a forced-convection heat exchanger which allows one to keep the temperature of the inner face of the stator, which is the most critical one, at an acceptable level in accordance with the characteristics of the materials used.

Another object of the present invention is to provide a forced-convection heat exchanger which also allows one to maintain low temperatures on the surface of the rotor.

Another object of the present invention is to provide a forced-convection heat exchanger which is highly reliable and relatively easy to manufacture at competitive costs.

Thus, the present invention provides a forced-convection heat exchanger for a rotary electrical machine, comprising one or more tubing elements that are arranged between the conductors of the stator windings of said rotary electrical machine so as to be in contact with the outer surface of said conductors with a cooling fluid flowing into said tubing elements.

BRIEF DESCRIPTION OF THE DRAWINGS

Further characteristics and advantages of the present invention will become apparent from the description of preferred but not exclusive embodiments of the heat exchanger according to the invention, illustrated only by way of nonlimiting examples in the accompanying drawings, wherein.

DESCRIPTION OF THE PREFERRED EMBODIMENTS

Figure 1:
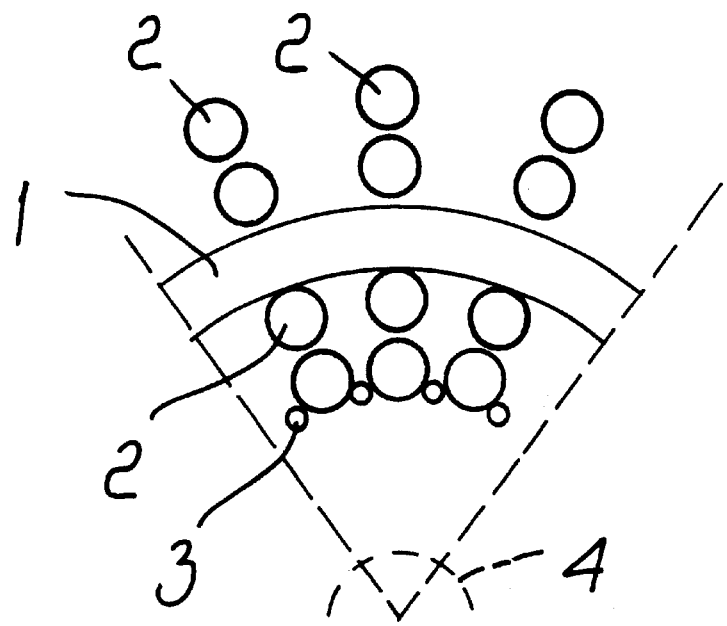
FIG. 1 is a partial schematic plan view of a first embodiment of the heat exchanger according to the present invention.

With reference therefore to the above cited figures, in which identical reference numerals designate identical elements, the heat exchanger according to the present invention is provided as follows.

FIG. 1 is a view of an embodiment of the forced-convection heat exchanger according to the present invention, in which there is shown a portion of the stator core 1 of the rotary electrical machine. There are also conductors 2 (for example made of copper) of the stator windings of the rotary electrical machine.

The forced-convection heat exchanger comprises one or more tubing elements 3 which are arranged between the conductors 2 so as to be in contact with the outer surface of the conductors 2.

A cooling fluid flows into said tubing elements 3 that, in a preferred embodiment of the present invention, are connected to a collector (not illustrated) for collecting the cooling fluid circulating into the tubing elements 3.

The collector may comprise preferably a first collector element and a second collector element that can be respectively connected to a first end and a second end of said tubing elements 3. Said first and second elements are preferably made of nonconductive material such as for example polyketon or polysuplfone resins. In this way the circulation of eddy currents is avoided, with a remarkable reduction of the dissipated power.

Preferably, the heat exchanger, according to the present invention, comprises a pumping device (not shown) which, being operatively connected to said tubing elements 3, will ensure forced convection of the cooling fluid.

According to a first embodiment, the tubing elements 3 of the heat exchanger are arranged so as to be aligned with the conductors 2 longitudinally along the body of the stator core 1.

Figure 3:
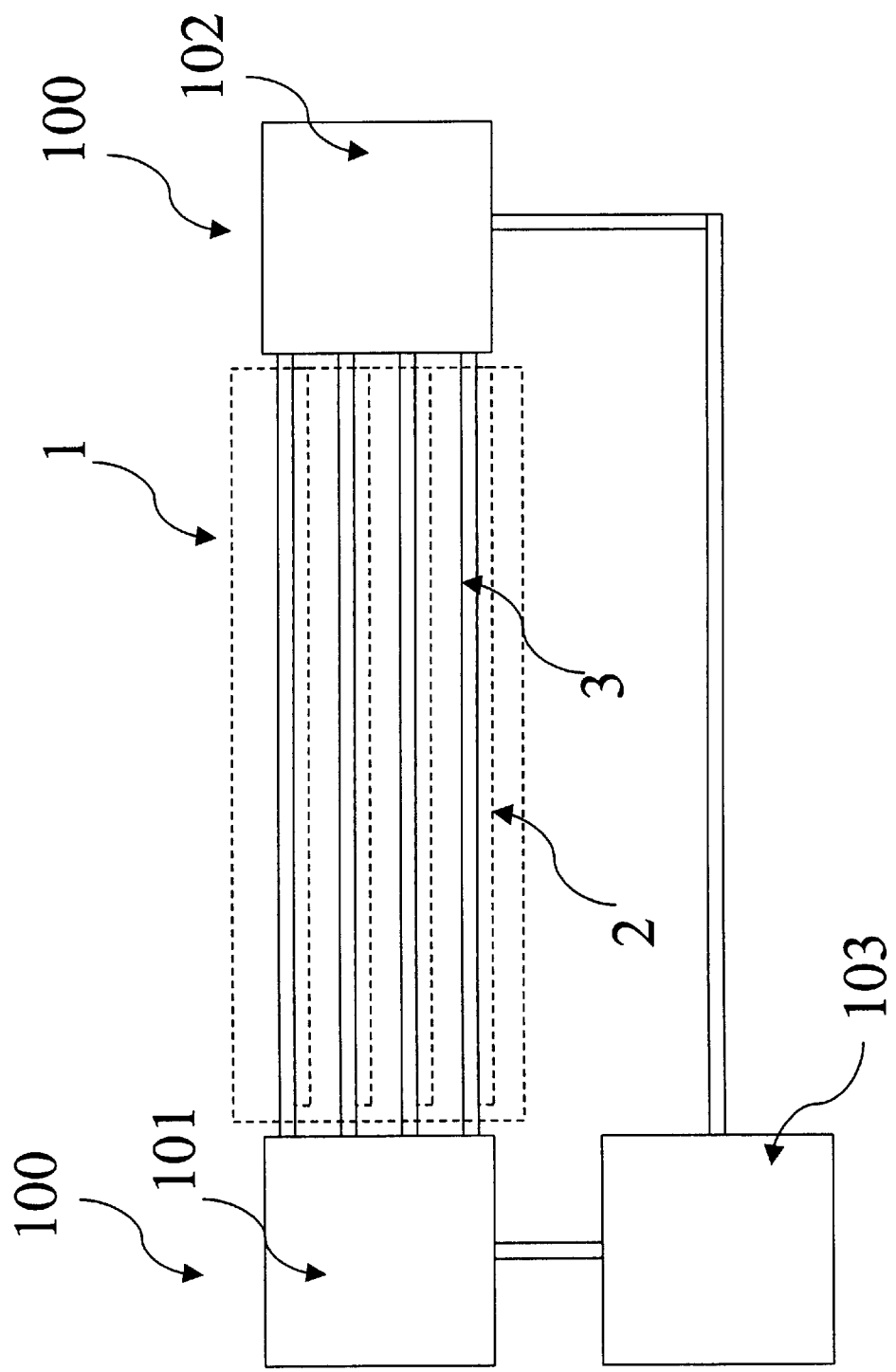
FIG. 3 is a partial schematic view of the environment for the present invention.

As shown in FIG. 3, the locations and the connections are illustrated between the tubing elements 3 of the heat exchanger, the stator conductors 2, the stator core 1, a collector 100, a first element 101 of the collector 100, a second element 102 of the collector 100, and a pumping device 103.

According to this embodiment, by the action of the pumping device, the cooling fluid enters proximate to one end of the stator core 1 and exits at the opposite end, in practice passing only once at the stator region to be cooled.

According to an alternative embodiment, the tubing elements 3 of the heat exchanger are arranged in a coiled configuration longitudinally along the stator body. According to this embodiment as well, the main axis of the tubing elements 3 is parallel to the conductors 2. Also according to this embodiment of the present invention, the cooling fluid can be pumped at one of the ends of the coil and in practice multiple passes of the fluid occur at the stator region to be cooled.

According to another embodiment, the tubing elements 3 of the heat exchanger are coupled to the conductors 2 so as to follow their path around the stator core 1. In practice, the tubing elements 3 can be coupled to the conductors 2, for example by banding insulation, and then wound around the stator core 1 together with the conductors 2 that constitute the stator windings.

Figure 4:
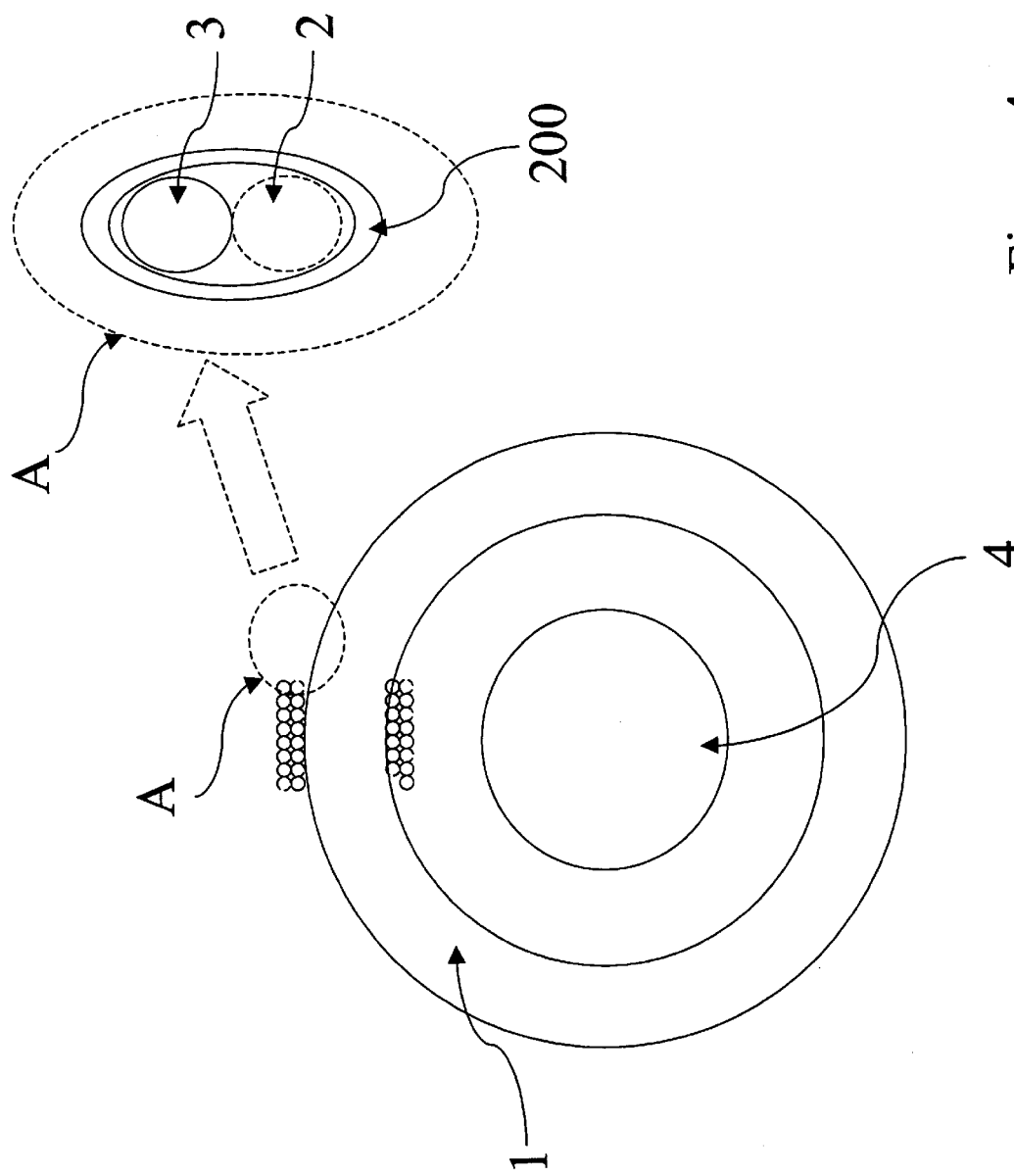
FIG. 4 is a partial schematic section view of the rotary electrical machine with a detailed view A to show the banding insulation.

In FIG. 4, a section of the rotary electrical machine is shown with the stator core 1 and the rotor 4. A detailed view A of the rotary machine shows a banding insulation 200 coupling the tubing element 3 of the heat exchanger and the stator conductor 2.

Figure 2:
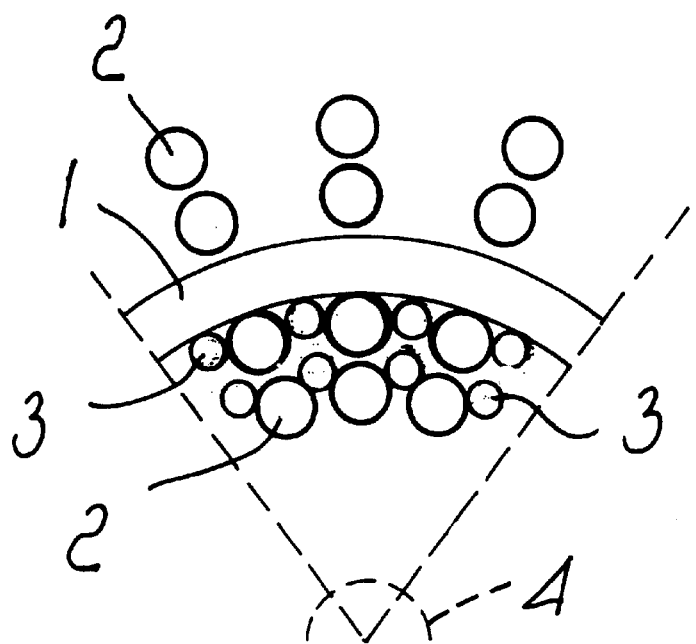
FIG. 2 is a partial schematic plan view of a second embodiment of the heat exchanger according to the present invention.

By using the described configurations, the tubing elements 3 can be arranged proximate to the surface of the stator that faces the rotor 4, as shown in FIG. 1, or can be fully inserted between the rows of conductors 2, as shown in FIG. 2.

The proposed solutions allow one to remove heat where it is generated and also will allow one to provide a temperature level on the face of the stator that faces the rotor 4 which allows one to maintain lower temperatures on the rotor 4 than are obtainable with conventional solutions.

Furthermore, the heat exchanger, according to the present invention, is extremely compact and can therefore be used even for compact electrical machines having high specific power levels.

The tubing elements 3 of the forced-convection heat exchanger, according to the present invention, can be made of metallic material, so as to facilitate optimum thermal contact with the surfaces to be cooled, or of electrically nonconducting material, such as for example PTFE (polytetrafluoroethylene).

As an alternative, it is possible to provide tubing elements 3 which have a configuration other than the circular one shown in FIGS. 1 and 2 and can be such as to substantially fill the space between the individual conductors 2 of the stator core 1.

In practice it has been observed that the forced-convection heat exchanger, according to the present invention, fully achieves the intended aim. In fact, it allows maximizing heat exchange efficiency by eliminating heat generated at the interface between the stator core 1 and the rotor 4 of an electric motor, though being compact and therefore suitable for use in electrical machines in general having a high specific power level, including compact ones.

What is claimed is:

1. A forced-convection heat exchanger being provided for a rotary electrical machine and having a rotor with a plurality of electrical conductors wrapped around a stator core, said heat exchanger comprising:

one or more tubing elements into which a cooling fluid flows, said tubing elements being inserted internally to the stator core and being arranged among the conductors so as to contact outer surfaces of the conductors;

wherein the tubing elements are coupled to and wound around the stator core together with the conductors that constitute stator windings;

wherein the tubing elements are operatively connected to a collector configured to collect the cooling fluid flowing from the tubing elements;

wherein the collector includes a first element and a second element that are respectively connected to a first end and a second end of the tubing elements; and wherein the first element and the second element are made of electrically nonconductive material.

2. A forced-convection heat exchanger according to claim 1, wherein the tubing elements are operatively connected to a pumping device that ensures forced convection of the cooling fluid.

3. A forced-convection heat exchanger according to claim 1, wherein the tubing elements are arranged close to an internal surface of the stator core facing the rotor.

4. A forced-convection heat exchanger according to claim 1, wherein the tubing elements are aligned with respect to the conductors longitudinally along the stator core.

5. A forced-convection heat exchanger according to claim 1, wherein the tubing elements are arranged in a coiled configuration.

6. A forced-convection heat exchanger according to claim 1, wherein the tubing elements are coupled to the conductors.

7. A forced-convection heat exchanger according to claim 6, further comprising:

banding insulation configured to couple the tubing elements to the conductors.

8. A forced-convection heat exchanger according to claim 1, wherein the tubing elements are made of metallic material.

9. A forced-convection heat exchanger according to claim 1, wherein the tubing elements are made of electrically nonconductive material.

10. A rotary electrical machine comprising:
- a forced-convection heat exchanger having
  - a rotor;
  - a stator core surrounding the rotor;
  - a plurality of electrical conductors wrapped around the stator core; and
  - one or more tubing elements into which a cooling fluid flows, said tubing elements being inserted internally to the stator core and being arranged among the conductors so as to contact outer surfaces of the conductors;
- wherein the tubing elements are coupled to and wound around the stator core together with the conductors that constitute stator windings;
- wherein the tubing elements are operatively connected to a collector configured to collect the cooling fluid flowing from the tubing elements;
- wherein the collector includes a first element and a second element that are respectively connected to a first end and a second end of the tubing elements; and
- wherein the first element and the second element are made of electrically nonconductive material.

* * * * *